Patented Aug. 15, 1950

2,518,519

UNITED STATES PATENT OFFICE 2,518,519

PRODUCTION OF RESINOUS MATERIALS

Herman S. Bloch, Chicago, Ill., assignor to Universal Oil Products Company, Chicago, Ill., a corporation of Delaware No Drawing. Application May 29, 1948,
Serial No. 30,161

9 Claims. (Cl. 260—17)

The present invention relates to new resinous products and to methods for their preparation. More particularly, this invention is directed to new compositions which comprise the reaction product of a mono- or polyallylether of a carbohydrate and an unsaturated ester of an adduct of a dicarboxylic dienophilic acid and a cyclic polyolefinic hydrocarbon containing isolated unsaturation in addition to conjugated unsaturation.

An object of the invention is to provide a new class of resinous compounds suitable for use in coating compositions, molding plastics, adhesives, etc. Another object of the invention is to provide a process for the production of said new resinous materials readily adaptable to commercial manufacture. Still another object of the invention is to provide for the production of high molecular weight resinous products containing a relatively high proportion of carbon-hydrogen and carbon-carbon bonds which provide a resin of enhanced solubility in organic solvents, including hydrocarbon liquids, and of improved water-resistance.

The present invention involves the preparation of resinous materials by the reaction of certain unsaturated compounds, the reactants comprising the adduct of an unsaturated ester of a dienophilic dicarboxylic acid with a cyclic, polyolefinic hydrocarbon containing a highly substituted dienic system and the mono- or poly-allyl or methallyl ethers of carbohydrate compounds such as cellulose, starch, etc.

The resinous product of the present process is believed to be essentially a copolymer of the polyolefinic cyclic hydrocarbon adduct of an unsaturated dicarboxylic acid ester and the mono- and/or polyallylethers of hexose carbohydrates comprising the reactants herein specified, the copolymerization reaction supposedly involving the olefinic double bonds contained in the molecular structure of the reactants. The character of the final product and its physical response to the application of heat and pressure, that is, its thermoplasticity will depend upon the number of functional unsaturated linkages in the structure of the reactants charged. Thus, ethers or esters of the types herein specified which contain more than one double bond per molecule are in effect poly-functional and yield on copolymerization, a thermosetting type of resin which is believed to contain "cross-linkages" between the otherwise linear copolymer chains. A monofunctional reactant, on the other hand, yields thermoplastic resinous products of a linear type, although the latter properties may also depend upon other physical and chemical characteristics of the individual reactants and upon the activity of the catalyst employed in the copolymerization reaction.

The concept that the unsaturation of the reactants herein specified accounts for their reactivity and the properties of the ultimate resinous product is believed to involve the isolated unsaturation of the polyolefinic hydrocarbon reactant after condensation with the dienophilic acid ester which supplies a certain residual unsaturation to the adduct after its conjugated unsaturation is eliminated in the Diels-Alder addition of the dienophilic acid to form the adduct. This residual unsaturation renders the adduct capable of copolymerizing through these additional olefinic double bonds with the olefinic linkages present (as well as through those provided by the unsaturation of the ester groups) in the mono- and polyallyl ethers.

One embodiment of this invention relates to a new class of resinous materials comprising the reaction products of an allyl ether of starch containing at least 2 allyl groups per hexose unit with a diallylmaleate adduct of a mixture of cyclic polyolefinic hydrocarbons containing conjugated as well as isolated unsaturation and further described in the following specifications.

One of the primary reactants utilized in the present process is the class of compounds referred to as the dienophilic-acid ester adducts of polyolefinic cyclic hydrocarbons, herein characterized as conjunct polymer hydrocarbons. The preferred method of producing these adducts is by means of a Diels-Alder type of addition reaction between a dienophilic acid ester and the conjugated dienic system contained in the conjunct polymers herein specified. The mixture of cyclic polyolefinic hydrocarbons or conjunct polymers involved in the Diels-Alder addition reaction are formed by means of a process known in the art as a conjunct polymerization type of reaction. In the latter reaction, certain types of hydrocarbons having a particular structure generally characterized as unsaturated and preferably non-aromatic when contacted with certain inorganic agents of the acid-acting type, at selected reaction conditions, undergo a particular type of reaction or series of reactions to form a sludge type product containing loosely bound complex addition compounds of the catalyst and said conjunct hydrocarbon polymers. The latter mixture of hydrocarbons may be recovered, free of the catalyst, from the sludge by special methods of decomposition. On the basis of physical and chemical analyses thereof, the mixture obtained from open-chain olefines is found to comprise highly unsaturated hydrocarbons containing compounds of high molecular weight and of generally cyclic, non-aromatic structure in which the unsaturation is both of the conjugated and non-conjugated variety. The cyclic structure, furthermore, comprises almost wholly five-membered rings.

The properties of the ultimately recovered mixture of conjunct polymers depends to some extent upon the type of hydrocarbons employed in the sludge-forming or conjunct polymerization reaction. Suitable hydrocarbon starting materials for the preparation of the sludge comprise, in general, the unsaturated hydrocarbons containing at least 3 carbon atoms per molecule, such as the mono-olefins, polyolefins and/or acetylenic hydrocarbons of either branched or straight chain structure, although branched chain hydrocarbons are believed to produce the sludge more readily and usually in greater yields. Cyclic olefins and isoparaffins may also be employed as charging stock, either individually or in admixture with, for example, mono or polyolefins. A mixture of the various classes of hydrocarbons specified above may also be charged to the reaction, the proportion of aromatic hydrocarbons in the mixture desirably being small or preferably nil, since the latter hydrocarbons tend to reduce the yield of sludge. An especially preferred charging stock from the standpoint of general availability and desirability in producing a sludge in high yields is an octene fraction of a selective or non-selective polymer gasoline (prepared by the copolymerization of various butylenes and/or propylenes) or the hexene-nonylene fraction of a propylene polymer. Other suitable hydrocarbon charging stocks for the preparation of the present conjunct polymers are the various fractions of thermally cracked gasoline which have been treated to reduce the content of aromatic hydrocarbons normally present in thermally cracked gasoline.

The inorganic conjunct polymerization catalysts which when contacted with the hydrocarbon charging stock having the above enumerated properties yields a sludge containing complex addition products of the catalyst with the conjunct polymers formed in the reaction are generally characterized as acid-acting polymerization catalysts and are generally substantially anhydrous. The catalysts utilizable in the present process include certain members of the anhydrous Friedel-Crafts metal halide group and certain inorganic acids. Thus, anhydrous aluminum chloride and aluminum bromide, either individually or in the presence of a promoter comprising the hydrogen halide corresponding to the halogen of the aluminum halide are capable of effecting conjunct polymerization of the unsaturated hydrocarbon charging stock. Of the inorganic mineral acids utilizable as catalysts, sulfuric acid of a concentration usually above about 85%, and preferably from about 95 to about 100% concentration and hydrofluoric acid containing at least 90% hydrogen fluoride (preferably the substantially anhydrous reagent) comprise another group of the generally broad class of acid-acting catalysts utilizable to effect conjunct polymerization.

On contacting the hydrocarbon charging stock and acid-acting catalyst at reaction conditions specified, generally, as "sludge-forming" or "conjunct polymerization" reaction conditions, the catalyst promotes polymerization, cyclization and hydrogen transfer reactions of the components of the reaction mixture to form products of two types: relatively saturated hydro-polymer, and high molecular weight cyclic polyolefin hydrocarbon compounds which combine with the catalyst in definite molecular proportions to form a catalyst-polyolefinic hydrocarbon addition complex comprising the sludge. The latter is a fluid, somewhat viscous product of the reaction containing definite chemical compounds of the coordinated complex type. The net result of the combined hydrogen transfer, polymerization and cylcization reactions (which, in effect, occur substantially as a simultaneous combination reaction referred to in the aggregate as a conjunct polymerization reaction) is the production of the polyolefinic cyclic hydrocarbons in combination with the catalyst as a sludge.

The sludge-forming reaction to form the primary polyolefinic cyclic hydrocarbon reactant is effected by contacting the hydrocarbon starting material of the aforementioned composition, preferably an olefinic charging stock composed of olefins having at least 3 carbon atoms per molecule with the conjunct polymerization catalyst at a temperature within the range of from about 0° to about 200° C. preferably from about 30 to about 125° C. and at superatmospheric pressure sufficient to maintain the reactants in substantially liquid phase. The reaction conditions required in the formation of a sludge for each of the conjunct polymerization catalysts hereinabove specified may vary, depending upon the activity of the catalyst. For example, temperatures in the lower range of the above temperature range are utilized when sulfuric acid is employed as catalyst, because of the oxidizing tendency of sulfuric acid at temperatures above about 150° C., the preferred reaction temperature for the use of sulfuric acid being within the range of from about 20° to about 125° C. Observation has shown that substantially anhydrous hydrofluoric acid having a concentration greater than about 95% is the preferred conjunct polymerization catalyst, not only on the basis of superior yields and quality of the hydrocarbon product recovered from the sludge, but also from the standpoint of certain operating advantages, especially in the sludge decomposition stage where thermal methods of decomposition may be employed, making it possible to recover, for recycling, a hydrogen fluoride effluent phase containing from 98 to about 100% anhydrous hydrogen fluoride. An optimum yield of sludge is obtained, when the weight ratio of olefins to the hydrogen fluoride catalyst charged to the sludge-forming reaction zone is maintained from about 1.5 to about 3.5, preferably from about 1.7 to about 2.5. The pressure within the reaction vessel is maintained sufficiently superatmospheric (generally up to about 100 atmospheres) to provide liquid phase conditions in the reactor. With the other catalysts mentioned, corresponding ratios of catalyst to hydrocarbon reactant are preferred.

At the above reaction conditions and when the reaction mixture of hydrocarbons and catalyst is mixed by some form of stirring device, sludge formation takes place within a few minutes, although the reaction may be allowed to continue for one or more hours to obtain peak production of the sludge. The liquid sludge phase and an upper layer saturated hydrocarbon phase formed as products of the conjunct polymerization reaction separate on standing, and the separate phases may be recovered by decanting one from the other.

The conjunct polymers or polyolefinic cyclic hydrocarbon drying oil mixture may be recovered from the sludge by any suitable method, depending upon the catalyst utilized in the formation of the sludge, although certain procedures provide advantages in operation which are not common to the other presently known methods of sludge decomposition. One of such methods, applicable to any of the conjunct polymerization catalyst sludges hereinabove referred to, results in the production of a highly unsaturated product but reduces the concentration of the recovered catalyst phase to the point that it cannot be economically recovered for recycling purposes to the sludge-forming stage. This method which consists in hydrolyzing the sludge in an aqueous medium is effected by thoroughly mixing the sludge with water or a dilute alkali solution. During the hydrolysis, the unsaturated conjunct polymer hydrocarbons associated with the catalyst in the sludge form a separate phase and rise to the top of the mixture, while the water-soluble catalyst enters the aqueous phase. In the case of the aluminum halides, the aqueous hydrolysis procedure hydrolyzes the catalyst chemically so that even by evaporation of the water, the original anhydrous aluminum halide can not be recovered as such by mere evaporation of the water. In the case of sulfuric acid and hydrogen fluoride, the water merely hydrolyzes the catalyst-conjunct polymer complex and the anhydrous catalyst may be recovered from the aqueous phase by removing the water therefrom. Attending the high cost of the recovery procedure for reconcentrating the acid, these methods require the use of acid-resistant equipment, not only in the aqueous hydrolysis step but also in the distillation equipment for concentrating the aqueous acid.

The necessity of recovering the conjunct polymerization catalyst in a nearly anhydrous state by means of an inexpensive procedure constitutes one of the chief advantages in the use of hydrogen fluoride as catalyst since hydrogen fluoride may be vaporized from the sludge, cooled and reliquefied for recycling purposes. The decomposition of the sludge may thus be effected by merely heating the sludge until the hydrogen fluoride component thereof is removed by vaporization, leaving a hydrocarbonaceous residue in which the component hydrocarbons contain more or less conjugated unsaturation, depending upon the conditions involved. The latter thermal decomposition method, however, as may be expected from the known polymerization activity of free anhydrous hydrogen fluoride, yields an inferior hydrocarbon product containing few if any, conjugated olefinic bonds desired in the production of the dienophilic adduct herein provided. The thermal decomposition method, however, may be modified to provide a method in which many of the disadvantages associated with the simple thermal decomposition are obviated. Such modified procedures involve decomposing the sludge in the presence of a sludge decomposition catalyst or in the presence of an inert diluent which dissolves the liberated sludge hydrocarbons immediately upon decomposition and removes them from contact with the free hydrogen fluoride. In the catalytic decomposition method the hydrogen fluoride sludge at a temperature of from about 50° to about 250° C. is charged into a reactor column packed with a catalytic material which enhances the decomposition of the sludge but retards the cracking and polymerization of the conjunct polymers released from the sludge. The hydrogen fluoride vapors, having a purity of from about 98 to 100% hydrogen fluoride, depending upon the temperature of operation, are taken overhead and condensed in auxiliary coolers, while the higher boiling conjunct polymer hydrocarbons are removed from the catalytic decomposition column as a bottoms fraction. The effective catalysts utilizable as packing materials in the catalytic decomposition column comprise certain metals which are resistant to corrosion by free hydrogen fluoride, graphitic carbon and metallic fluoride or oxyfluoride salts. Among the preferred catalysts for effecting the decomposition, lead, copper and cobalt as well as certain brasses containing copper, lead and tin have been found to be some of the most effective in obtaining decomposition of the sludge and recovery of the hydrocarbon product in which the components contain a maximum of conjugated and non-conjugated unsaturation.

In the thermal decomposition method involving decomposition of the hydrogen fluoride sludge by charging the same into a liquid pool of inert diluent, the temperature of the diluent is maintained sufficiently high that the hydrogen fluoride released upon decomposition of the sludge is immediately vaporized and separated from the liquid hydrocarbon phase in the reactor. The temperature maintained in the reactor is, on the other hand, sufficiently below the boiling point of the conjunct polymer hydrocarbon product that very little of the latter hydrocarbons are flashed into the hydrogen fluoride vapor outlet. Suitable inert liquids into which the hydrogen fluoride sludge is charged may be a hydrocarbon such as a paraffin or a naphtha boiling from about 50° to about 180° C., preferably from about 110° to about 140° C. Such hydrocarbons include the octanes, nonanes, decanes, or a mixture thereof such as a fraction of a straight run gasoline boiling in the above range, diethylcyclohexane, trimethylcyclohexane, etc. Other inert diluents include the haloalkanes such as bromo- or chloroheptane and various inorganic compounds such as salts melting below the above desired temperature range of operation and which are chemically stable to hydrogen fluoride. The heat of vaporization of the hydrogen fluoride and the heat of decomposition may be supplied in the decomposition zone by maintaining the inert diluent under reflux and allowing the hydrogen fluoride sludge to come into direct contact with the hot vapors from the reboiling section.

The mixture of hydrocarbons comprising the product of the conjunct polymerization reaction containing hydrocarbons having conjugated and non-conjugated unsaturation recovered from the conjunct polymerization sludge contains a series of high molecular weight cyclic compounds of wide boiling range but of generally homologous structure, the cyclic portion of the hydrocarbons having a cyclopentenyl structure in which the olefin bond of the cyclopentene ring is in conjugation with an olefinic bond present in an alkenyl or alkapolyenyl side chain. Infra-red and ultraviolet adsorption studies, as well as other analytical data, determined on the recovered conjunct polymers have indicated that the individual hydrocarbons are cyclic, although substantially non-aromatic, have isolated unsaturation in addition to conjugated unsaturation, and that the four carbon atoms which constitute the conjugated system are highly substituted, possessing, on the average, fewer than two hydrogen atoms as substituents. The hydrocarbons boil from about 150 to over 450° C., have bromine numbers above about 140, maleic anhydride values of from about 30 to about 90, an average number of olefinic double bonds per molecule from about 2.5 to about 4, of which from about 40 to about 70% are conjugated and average molecular weights of from about 250 to about 400, although some components may have molecular weights as high as about 1000. It is preferred, in the preparation of the present resinous products to utilize the relatively low-boiling ends of the mixture of conjunct polymers recovered from a sludge, as these are usually of lighter color and ultimately produce resin of lighter color than the higher boiling fractions of the conjunct polymer mixture. For this purpose, fractions boiling up to about 300° C. are preferred.

Because of the high degree of substitution of the carbon atoms comprising the conjugated system in the polyolefinic cyclic hydrocarbons, herein specified, its reactivity is considerably less than the reactivity of less highly substituted dienes; accordingly, only a small amount of polymerization accompanies the formation of the adduct in the Diels-Alder addition reaction thereof with dienophilic acid esters. This adduct, which contains at least two rings per molecule, because of the isolated unsaturation in the hydrocarbon reactant likewise contains more than one double bond per molecule and is therefore capable of subsequently undergoing co-polymerization reactions with other unsaturated compounds with greater facility than more highly saturated adducts would. The presence of the residual unsaturated double bonds within the adduct further accounts to some extent for the production of resinous products by means of the present process, since the unsaturated bonds therein participate in the co-polymerization and cross-polymerization of the adduct with the other class of reactants herein, the allyl carbohydrate ethers.

The adduct of the mixture of conjunct polymers and the dienophilic acid ester is most conveniently prepared by heating a mixture of the conjunct polymers or a fraction thereof with an equivalent amount of the ester, such as diallylmaleate, until the resulting Diels-Alder addition reaction is complete. One of the preferred dienophilic acid esters comprises diallylmaleate although other dienophilic acid esters may be utilized similarly in the present process, typical examples of which include the fumaric, citraconic, mesaconic and itaconic esters of β,γ-olefinic alcohols such as crotyl, methallyl, and cinnamyl alcohols. Formation of the adduct is preferably effected at a temperature of from about 70° to about 110° C., although for the various dienophilic acid esters, the temperature may range from about 25° C. to as high as about 175° C. In general, the higher the molecular weight or boiling point of the conjunct polymer utilized, the higher the temperature required to effect the Diels-Alder addition reaction with the dienophilic acid ester. The adducts may also be prepared by the esterification of the corresponding dienophilic acid anhydride adduct of the conjunct polymer hydrocarbons with the appropriate alcohol. For example, the diallylmaleate adduct may be prepared by esterification of the maleic anhydride adduct of the conjunct polymer hydrocarbons with allyl alcohol. The esterification reaction is enhanced in the presence of an acid catalyst, such as sulfuric acid, but the side reactions which take place during the principal conversion usually reduce the yield of product below that obtained by the direct addition of the dienophilic acid ester to the conjunct polymer.

The other primary reactant involved in the resin-forming condensation reaction and which undergoes co-polymerization with the cyclic polyolefinic hydrocarbon adduct of the dicarboxylic acid ester in accordance with the process of the present invention is referred to herein as a mono- or polyallyl or methallyl ether of a carbohydrate. The compounds comprising this class are prepared by reacting a carbohydrate or polysaccharide with a suitable methallyl, or allyl compound capable of yielding the corresponding methallyl or allyl groups when reacted with the carbohydrate in the presence of a condensing agent, such as an alkali metal hydroxide, etc. In this condensation reaction an alkali metal salt of the carbohydrate or a mixture of the carbohydrate in an aqueous alkali hydroxide solution is intimately contacted with the allylating or methallylating reagent at reaction conditions suitable to effect substitution of the hydrogen atom or atoms of one or more hydroxyl groups of the carbohydrate compound with the allyl or methallyl radical via double decomposition of the alkali metal salt of the carbohydrate and the allylating reagent containing the allyl or methallyl groups. Any of the known hexose carbohydrates or the corresponding polysaccharides are utilizable in the preparation of the present ethers, including such carbohydrates as sucrose, starch from various vegetable sources such as potato starch, corn starch, tapioca starch, waxy maise starch, etc., various types of cellulose such as wood and cotton fibers and the aldose and ketose sugars such as glucose, fructose, maltose, etc.

In the preparation of an allyl carbohydrate ether by substituting an allyl group on the carbohydrate hexose molecule, an allylating agent such as allyl chloride, allyl bromide, or diallyl sulfate is reacted with the carbohydrate or its alkali metal salt in the presence of an alkali metal hydroxide, usually dissolved in water. The corresponding methallyl carbohydrate ethers are prepared by a similar reaction mechanism utilizing a methallyl halide or sulfate in the reaction as the allylating reagent. The alkali metal carbohydrate salts may be prepared in situ or, as in the case of producing the cellulose ethers, the alkali metal salt is generally prepared prior to the allylating reaction by treating the carbohydrate itself with an aqueous solution of an alkali metal hydroxide and separating the resulting alkali metal salt of the carbohydrate from the excess caustic. The latter isolated salt is then reacted further with the allylating reagent when the polysubstituted ether is desired. In the preparation of the allyl carbohydrate ethers it has been observed by the prior art that in order to obtain the polysubstituted allyl ethers at least 20 mols of the allylating agent per mol of carbohydrate are required in the reaction and that excess aqueous caustic, preferably as highly concentrated as possible, is desired, not only in enhancing the yield of ethers, but in decreasing the hydrolysis of the allylating reagent as well, making it possible to recover excess allylating agent upon completion of the reaction. A highly concentrated aqueous caustic (preferably containing at least 40% of the alkali metal hydroxide) is preferred further on the basis that the more desirable polysubstituted allyl or methallyl ethers are obtained when utilizing the latter concentrated reagent. Although sodium hydroxide is the preferred alkali metal hydroxide for economy reasons, potassium hydroxide and lithium hydroxide may be likewise employed. It is also desirable from the standpoint of obtaining an enhanced yield of the more desirable polysubstituted ethers as well as avoiding degradation of the product and formation of hydration products of the allylating reagent to employ an excess of caustic of from about 1 to about 5 mols over the number of mols of allylating reagent in the reaction mixture. The effect of an excess of the allylating reagent on the extent of etherification of the carbohydrate hydroxyl groups is shown by a comparison of the extent of polysubstitution as a variable of the amount of allylating reagent present in the reaction mixture. For example, below 10 mols of allylating reagent per mol of carbohydrate, an average of from one to two allyl groups will generally be substituted on the hydroxyl radicals of each hexose unit, whereas a molar ratio of allylating agent per mol of carbohydrate of from about 20 to about 30 results in the formation of ethers containing from about 2.2 to about 2.8 allyl or methallyl groups per hexose unit. The allylating reaction (the term referring both to the substitution of methallyl as well as allyl groups) is effected at temperatures of from about 70° to about 150° C. (preferably from about 85° to about 125° C.) usually at sufficiently superatmospheric pressures to maintain the reactants substantially in liquid phase, for example, by pressurizing the reactor with an inert gas such as nitrogen. The reaction attains equilibrium within a reaction period usually of from about 2 to about 12 hours and the carbohydrate ether is recovered from the resulting reaction mixture by steam distilling the excess reactants and by-products therefrom and reprecipitation of the carbohydrate ether from suitable solvents such as alcohols and liquid hydrocarbons. The mono- and polyallyl carbohydrate ethers may vary from viscous, non-tacky gums to solid, friable substances. In general, it is preferred to utilize the polyallyl or polymethallyl ethers containing at least 2, up to about 2.8 allyl groups per molecule of carbohydrate in the formation of the present resinous products. The polysubstituted carbohydrate ethers are usually friable powders and yield harder resins, less susceptible to solvents, although the physical properties of the ethers also vary with the reactants and the reaction conditions utilized in their preparation.

In the resin-forming reaction to prepare the ultimate product of the present invention, the condensation of the reactant referred to as an adduct of an unsaturated ester of a dicarboxylic dienophilic acid with a mixture of polyolefinic cyclic hydrocarbons or conjunct polymers and a mono- or polyallyl or methallyl ester of a carbohydrate can be facilitated by heat, light, or the presence of a catalyst in the condensation reaction. Suitable catalysts include acids known to effect polymerization such as the various mineral acids including sulfuric, hydrofluoric and phosphoric acids; the Friedel-Crafts metal halides such as aluminum chloride, zinc chloride, ferric chloride, etc; peroxide catalyst such as benzoyl peroxide, di-t-butyl peroxide and other oil soluble peroxides and the complex alcoholates, etherates, ketonates of Friedel-Crafts metal halides such as aluminum chloride, zinc chloride, etc. and of boron trifluoride.

The temperature selected for the resin-forming or co-polymerization reaction depends upon the amount and type of catalyst used, upon the particular type of ethers utilized and upon the type of resinous product desired from the reaction. In general, temperatures of from about 25° C. up to about 300° C. are suitable, with reaction periods ranging from several hours to several days, depending upon the temperature.

The ratio of reactants utilized in the resin-forming reaction may be varied at will from about 10 per cent of the polyolefinic cyclic hydrocarbon adduct to about 10 per cent of the allyl carbohydrate ether reactant, depending upon the properties of the ultimate resin desired. In general, a higher proportion of the adduct reactant results in a resin of greater water and alkali-resistance. In the preparation of resinous products for ultimate utilization in formulating varnishes or for laminating purposes, the co-polymerization reaction may be halted prior to completion and the final thermosetting stage completed by baking or air-drying with or without the addition of metallic driers. Superatmospheric pressures may be required to maintain the reactants or catalyst in a non-volatilized state and the pressure factor is usually specified as sufficient to maintain a substantially liquid phase. A solvent or diluent may be utilized during the reaction to alter the reaction rate or modify the properties of the ultimate product obtained. For this purpose a solvent for one or both of the reactants or the final product may be utilized, such as alcohols, liquid hydrocarbons, halogenated hydrocarbons, ethers, etc. The molecular weight of the product is usually dependent upon the temperature and time of the reaction, the amount of catalyst utilized and the presence or absence of a solvent or diluent, the highest molecular weight products being obtained with relatively small concentrations of catalyst and at relatively low temperatures with long reaction periods. It should be re-emphasized that in order to obtain a soluble or fusible product, the reaction must be interrupted considerably short of completion.

The resulting resinous products may be used for a variety of purposes, largely depending upon other characteristic properties. For example, the resins are useful in the formulation of decorative and protective coating compositions such as the resinous component in paints and varnishes. The products are likewise useful as plasticizers, molding powders, resins for laminating purposes, adhesives, extenders of other resins, etc.

The following example is introduced to illustrate the product of the present invention and the methods employed for preparing the same. In thus specifying particular reactants and reaction conditions, however, it is not intended to limit the scope of the invention in accordance with the data specified.

*Production of a mixture of cyclic polyolefinic hydrocarbons*

A polymer gasoline consisting predominantly of octenes (the polymers and co-polymers of $C_3$ and $C_4$ olefins) having a bromine number of about 130 was reacted with substantially anhydrous hydrogen fluoride at a temperature of 78° C., pressure of approximately 5 atmospheres and utilizing a gasoline to hydrogen fluoride (liquid) volumetric ratio of 2:1 in a stirred pressure autoclave for a reaction period of approximately one-half hour. The reaction mixture separated into two phases, an upper hydrocarbon layer and a lower hydrogen fluoride sludge phase which was decanted from the hydrocarbon layer and hydrolyzed by allowing the liquid sludge phase to run into a quantity of ice sufficient to maintain the mixture at substantially 0° C. The hydrolysis reaction resulted in the release of a hydrocarbon phase from the sludge which accumulated above the aqueous hydrofluoric acid phase, was separated, neutralized with a dilute aqueous caustic solution and fractionated. A fraction boiling from about 200° to about 275° C. was utilized in the following preparation of a dienophilic, dibasic acid, ester adduct.

*Preparation of adduct*

An adduct of the above mixture of polyolefinic cyclic hydrocarbons contained in the fraction boiling from about 200° to about 275° C. was prepared by reacting said fraction with diallyl maleate. 24 parts by weight of the hydrocarbon fraction was combined with 19.75 parts by weight of diallyl maleate and heated over a water bath in an atmosphere of carbon dioxide for a total reaction period of approximately 10 hours. The reaction was started at a temperature of from about 80° to about 95° C. and completed at a temperature of about 180° C. The reaction mixture, following the indicated period of reaction, was vacuum distilled to remove unreacted material and the residue comprising the diallyl adduct ester of the polyolefinic cyclic hydrocarbons was found to be a viscous, light yellow fluid containing 74.91% carbon and 9.09% hydrogen, with a molecular weight of approximately 437.

*Preparation of allyl carbohydrate ether*

The methallyl ether of cellulose (cotton linters) was prepared by reacting a mixture of methallyl chloride, alkali cellulose and benzene at suitable reaction conditions. Alkali cellulose was prepared by steeping 850 parts of shredded cotton linters in an aqueous caustic solution containing 18% sodium hydroxide and 1% sodium formate for 1.5 hours and at room temperature. 900 parts of the above prepared alkali cellulose were introduced into a pressure autoclave containing 2000 parts by weight of benzene, 9000 parts of methallyl chloride (approximately 25 mols of methallylating agent per hexose unit) and 2000 parts of powdered sodium hydroxide. Nitrogen was introduced into the autoclave to displace the air originally present therein and the contents heated at 120° C. for 10 hours as the contents of the autoclave were stirred. Following the above reaction period, the contents of the autoclave were cooled and approximately 1500 parts of water added with stirring, resulting in the formation of an emulsion-like product. The mixture was neutralized with dilute sulfuric acid, then steam distilled to remove benzene and excess methallyl chloride and to precipitate the cellulose ether. The product was washed successively, with plain water, water containing 1.0% acetic acid, water containing 0.1% sulfuric acid, and again with plain water. The product ether contains approximately 2.5% methallyl groups per hexose unit.

*Co-polymerization of cellulose ether and adduct to form a resinous product*

A mixture of the diallyl maleate adduct prepared as above and the methallyl ether of cellulose was reacted in the presence of 0.5 weight per cent of benzoyl peroxide at 140° C. until a clear semi-solid resinous product was obtained. This was soluble in hydrocarbon solvents, but was convertible by baking or air-drying to a clear, transparent insoluble and infusible mass of considerable toughness and resistance to chemical attack. Varying proportions of reactants may be utilized; a reaction mixture containing two weight proportions of diallyl maleate adduct and one weight proportion of the methallyl cellulose ether prepared above when co-polymerized for 1.5 hours at a temperature of 120° C. yielded a hard, transparent resin which was insoluble in organic solvents and infusible. The final resinous product tends to acquire softer properties as the proportion of cellulose ether is increased in the reaction mixture and is harder, more readily thermosetting as the proportion of diallyl maleate adduct is increased in the reaction mixture.

I claim as my invention:

1. A process for the production of a resinous product which comprises reacting at a temperature of from about 25° to about 300° C. a carbohydrate ether containing at least one allyl ether group per hexose unit of a hexose carbohydrate reactant with an unsaturated ester of a dicarboxylic dienophilic acid adduct of a mixture of cyclic polyolefinic hydrocarbons having a highly substituted diene carbon atom system recovered from a catalyst-hydrocarbon complex formed in catalytic conjunct polymerization of hydrocarbons, said cyclic polyolefinic hydrocarbons having bromine numbers above about 140, maleic anhydride values of from about 30 to about 90, and an average number of olefinic double bonds per molecule of from about 2.5 to about 4, of which from about 40 to about 70% are conjugated.

2. The process of claim 1 further characterized in that said allyl carbohydrate ether contains at least two allyl ether groups per hexose unit of said carbohydrate.

3. The process of claim 1 further characterized in that said carbohydrate ether is a polyallyl ether of cellulose.

4. The process of claim 1 further characterized in that said carbohydrate ether is a polyallyl ether of starch.

5. The process of claim 1 further characterized in that said ether is a polymethallyl ether of a hexose carbohydrate.

6. The process of claim 1 further characterized in that said reaction of the carbohydrate ether and said cyclic polyolefinic hydrocarbon adduct is effected at a pressure sufficient to maintain the reaction mixture in substantially liquid phase and wherein the reaction mixture contains from about 10% to about 90% of said dicarboxylic dienophilic acid ester adduct of said cyclic polyolefinic hydrocarbons.

7. The process of claim 1 further characterized in that a fraction boiling up to about 300° C. of said cyclic polyolefinic hydrocarbons is utilized in the formation of said adduct.

8. The resinous product formed by the process of claim 1.

9. The resinous product formed by the process of claim 6.

HERMAN S. BLOCH.

REFERENCES CITED

The following references are of record in the file of this patent:

UNITED STATES PATENTS

| Number | Name | Date |
|---|---|---|
| 2,409,633 | Kropa | Oct. 22, 1946 |
| 2,421,876 | Gerhart | June 10, 1947 |

OTHER REFERENCES

Nichols Official Digest, March 1945, pages 111–123.